United States Patent [19]
Khanna et al.

[11] Patent Number: 5,890,174
[45] Date of Patent: Mar. 30, 1999

[54] METHOD AND SYSTEM FOR CONSTRUCTING A FORMULA IN A SPREADSHEET

[75] Inventors: Karan Khanna, Clyde Hill; Edward A. Martinez, Redmond, both of Wash.

[73] Assignee: Microsoft Corporation, Redmond, Wash.

[21] Appl. No.: 558,820

[22] Filed: Nov. 16, 1995

[51] Int. Cl.[6] .................................................. G06F 15/00
[52] U.S. Cl. ........................................................ 707/504
[58] Field of Search ................................. 395/938, 939, 395/940, 941, 932; 345/440; 707/503, 504, 509, 510

[56] References Cited

U.S. PATENT DOCUMENTS 5,255,356  10/1993  Michelman et al. ..................... 707/504
5,280,575   1/1994  Young et al. .......................... 707/504
5,652,889   7/1997  Sites ................................... 707/504

Primary Examiner—Phu K. Nguyen
Attorney, Agent, or Firm—Jones & Askew, LLP

[57] ABSTRACT

A method and system for assisting a user in constructing a formula in a cell of a spreadsheet operating on a computer system. A function dialog box is displayed that lists various functions that may be selected by the user to be entered into the formula. By selecting a button in the function dialog box, an insert function dialog box is displayed that lists additional functions by category. When the user selects a function, a parameter dialog box associated with the selected function is displayed. Parameters may include cell addresses as well as numerical or other data entered directly by the user. The parameter dialog box displays the formula as it is being constructed. After the parameters have been entered, a result dialog box is displayed that allows the user to select the result cell in which to place the formula. The user selects the result cell and the result dialog box is removed from the display screen, the formula is entered in the result cell, and the result of the formula is displayed in the result cell.

48 Claims, 17 Drawing Sheets

METHOD AND SYSTEM FOR CONSTRUCTING A FORMULA IN A SPREADSHEET

TECHNICAL FIELD

The present invention relates generally to the entry of information in spreadsheet computer programs and, more specifically, to a system and method for constructing and entering a formula in a cell of a spreadsheet.

BACKGROUND OF THE INVENTION

Spreadsheet programs are widely-used application programs that run on personal computers. Spreadsheet programs are commonly used for budgets, forecasting, and other finance-related tasks. In a spreadsheet program, data and formulas are entered in ledger-like forms for analysis, tracking, planning, or evaluations of the impacts of real or proposed changes on data.

Spreadsheet programs use rows and columns of cells for the display of data. Depending on the program, a single spreadsheet can contain anywhere from thousands to millions of cells. Some spreadsheet programs can also link one spreadsheet to another spreadsheet that contains related information and can update data in linked spreadsheets automatically. Spreadsheet programs may also include macro facilities, and some can be used for creating and sorting databases. For printed output, spreadsheet programs usually provide graphing capabilities and a variety of formatting options for both printed pages and text, numeric values, and captions and legends in graphs.

Each row and column in a spreadsheet is unique, so each cell is uniquely identified. Typically, each column is identified by a letter, and each row is identified by a number. Thus, the cell located at the intersection of column A and row 1 is identified as cell A1. Each cell is displayed as a rectangular space that can hold text, numerical data, or a formula that uses parameters, which may comprise data in other cells, to calculate a desired result. To ease computation, spreadsheet programs include built-in functions that perform standard calculations.

Such built-in functions may include simple arithmetic functions such as addition (designated by the + character), subtraction (designated by the—character), and multiplication (designated by the * character). Many other functions may be provided in the spreadsheet, including complex trigonometric functions to calculate the sine or cosine of a variable (designated by SIN and COS, respectively), and functions to find the natural logarithm and exponential value of a variable (designated by LN and EXP, respectively). Many other functions are provided by spreadsheet programs to perform a wide variety of calculations and data comparisons.

A formula may be constructed within a cell of the spreadsheet using one or more of the built-in functions combined with any other constants or variables. The proper syntax of each formula is entered into the spreadsheet directly by the user through the use of keystrokes on a keyboard. The various functions available in spreadsheet formulas are denoted by a particular character or characters. For example, the very simple formula A1+B1 may be entered in the spreadsheet when the user wants to add the numbers located in cells A1 and B1. More complicated formulas utilizing unfamiliar and complex functions require the user to manually enter a function identifier, such as SIN, COS, etc., to use the function. Therefore, it is clear that the use of functions in spreadsheet formulas requires that the user memorize the syntax required to correctly enter the formula. Thus, formula entry can quickly become very difficult for the user, and the probability of improperly entering such formulas is high.

Spreadsheet programs are popular among both sophisticated, expert computer users as well as ordinary, novice users. Ordinary users may include homeowners who use spreadsheet programs for maintaining household budgets and personal finances. Other ordinary users may include small business owners who use spreadsheets to perform tasks such as tracking inventory, costs, sales, etc. Frequently, these tasks require the use of complicated formulas in the spreadsheet program.

These ordinary users of computers are usually not well-versed in mathematics or computer syntax related to the formulas that can be entered in the spreadsheet. Therefore, the user may not remember the proper syntax and function identifiers required for various functions and therefore may incorrectly enter the formula or may be forced to consult a lengthy and complicated user's manual to obtain the correct syntax.

Current spreadsheet programs, such as Excel, manufactured by Microsoft Corporation of Redmond, Wash., assignee of the present invention, require that the user is familiar with the complicated syntax needed to enter formulas in the spreadsheet. Thus, when the user wishes to enter a formula in the spreadsheet, the user must manually enter the formula including all proper syntax using the keyboard without being aided or prompted by the spreadsheet program.

When a user manually enters a formula, the probability of errors in the formula are high. Common errors include improperly referencing other cells that are part of the calculation, transposing cell addresses (identifying cell A1 as cell 1A), placing multiple operators together, and mismatching parentheses. Also, incorrect spacing as well as various other typographical errors can result in an improperly entered formula.

Current spreadsheet programs utilize a "function wizard". The wizard assists the user with the entry of parameters into an individual function but does not allow the user to enter functions into the formula. Thus, the function wizard, while assisting the user with certain aspects of formula construction, only assists the user after the proper syntax for a function has been manually entered. Consequently, function wizards associated with current spreadsheet programs do not free the user from the difficult task of remembering and entering the proper formula syntax. Thus, function wizards do not assist the user in the construction of a formula in its entirety.

Also, current function wizards do not perform error correction. Although current spreadsheet programs are able to detect an improperly entered formula and generate and display a message to the user, current programs do not detect the precise error that is present within the formula and also do not provide a suggestion for the correction of the error. If the user incorrectly enters a formula, current spreadsheet programs generate a generic error message to the user indicating that the formula has been incorrectly entered. However, the generic error message neither detects nor notifies the user of the type or location of the error. Therefore, without knowing what type of error is present in the formula, a user is left with the tedious and frustrating task of poring through a lengthy and complicated formula to detect where the error exists and editing the formula to correct the error. This increases user frustration and decreases efficiency.

All of these problems associated with formula entry serve not only to make the use of formulas in spreadsheets time-consuming and inefficient but also frustrating for the user. These problems may force a frustrated user to simply give up and cease entering formulas in spreadsheet programs. By not efficiently and effectively utilizing all of the benefits that spreadsheet formulas provide, the user does not maximize the capabilities of the spreadsheet program.

SUMMARY OF THE INVENTION

The present invention provides a method and system that assists a user in the construction of a formula in a cell of a spreadsheet. The present invention displays a function dialog box that lists various functions that may be selected by the user to be entered into the formula. By selecting a button in the function dialog box, an insert function dialog box is displayed that lists additional functions by category.

When the user selects a function, a parameter dialog box associated with the selected function is displayed. The present invention displays suggested parameters in the parameter dialog box when predetermined functions are selected. The suggested parameters are cell addresses that are identified and displayed based on the position of cells above the current cell and to the left of the current cell that are filled with data. The suggested parameters that are displayed in the parameter dialog box can be accepted by the user by selecting a button in the parameter dialog box, or the user can enter other parameters. Other parameters may include cell addresses as well as numerical or other data entered directly by the user.

As the parameters are being entered, the parameter dialog box displays the formula as it is being constructed. After the parameters have been entered, a result dialog box is displayed that allows the user to select the result cell in which to place the formula. The default result cell is displayed in the result dialog box as the address of the current cell, which is the cell that was highlighted when the user initiated the method of the present invention. The default result cell can be accepted by the user by selecting a button in the function dialog box, or the user can enter another result cell.

When the result cell has been entered, the result dialog box is removed from the display screen, the formula is entered in the result cell, and the result of the formula is displayed in the result cell.

DETAILED DESCRIPTION OF THE PREFERRED EMBODIMENT

Figure 1:
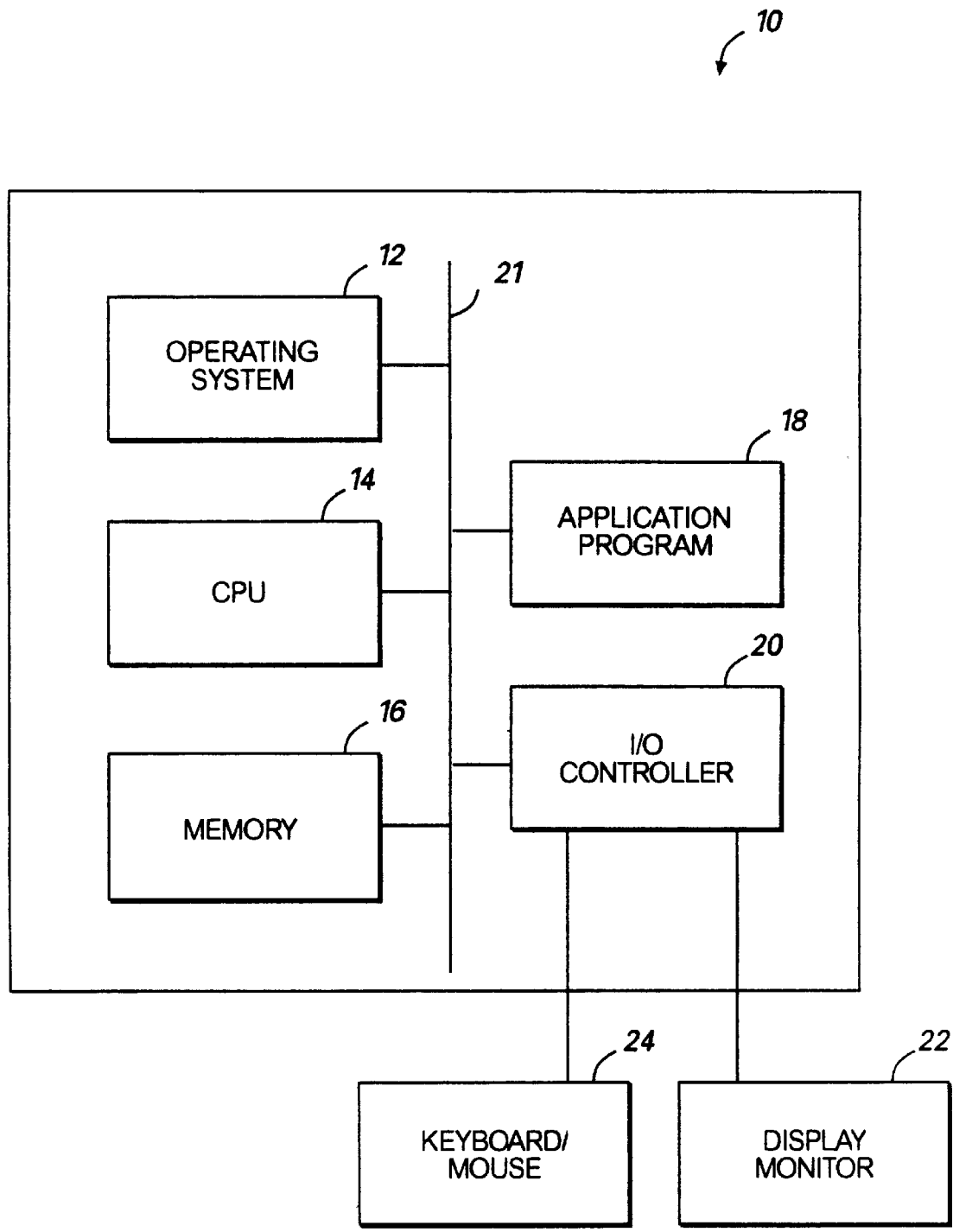
FIG. 1 is a block diagram of a computer system on which the present invention is implemented.

Turning next to the figures, the preferred embodiment will now be described in detail. The present invention is directed to a method and system for entering formulas in a spreadsheet. Although the preferred embodiment of the present invention will be described with respect to spreadsheet programs, those skilled in the art will recognize that the present invention may be utilized in connection with other software programs in which mathematical or other types of formulas are entered.

Turning first to the nomenclature of the specification, the detailed description which follows is represented largely in terms of processes and symbolic representations of operations by conventional computer components, including a central processing unit (CPU) associated with a general purpose computer system, memory storage devices for the CPU, and connected pixel-oriented display devices. These operations include the manipulation of data bits by the CPU and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. It must be understood that no involvement of a human operator is necessary or even desirable in the present invention. The operations described herein are machine operations performed in conjunction with a human operator or user that interacts with the computer. The machines used for performing the operation of the present invention, as will be understood, include general purpose digital computers or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Furthermore, it should be understood that there is a distinction between the methods, steps, or operations completed by a computer and the method of computation itself. The present invention does not involve a method of computation. Instead, the present invention relates to methods, processes, steps, or operations for a computer and the processing of electrical or other physical signals to generate desired physical signals and to display results and interactions.

Turning now to the drawings, in which like numerals indicate like elements throughout the several figures, FIG. 1 illustrates a computer system on which the preferred embodiment of the present invention is implemented. Referring to FIG. 1, the computer system is generally shown at 10. The computer system includes an operating system 12, a central processing unit (CPU) 14, a memory storage device 16, an application program or program module 18, and an input/output (I/O) controller 20. The above referenced components are operatively connected by a system bus 21. Connected to the computer is a display 22, preferably a video monitor, for displaying images to a user, and an input means 24, preferably a keyboard and mouse, for allowing a user to input data into the computer system. The application program or program module 18 includes a spreadsheet program that permits the user to enter formulas into cells of the spreadsheet.

Figure 2:
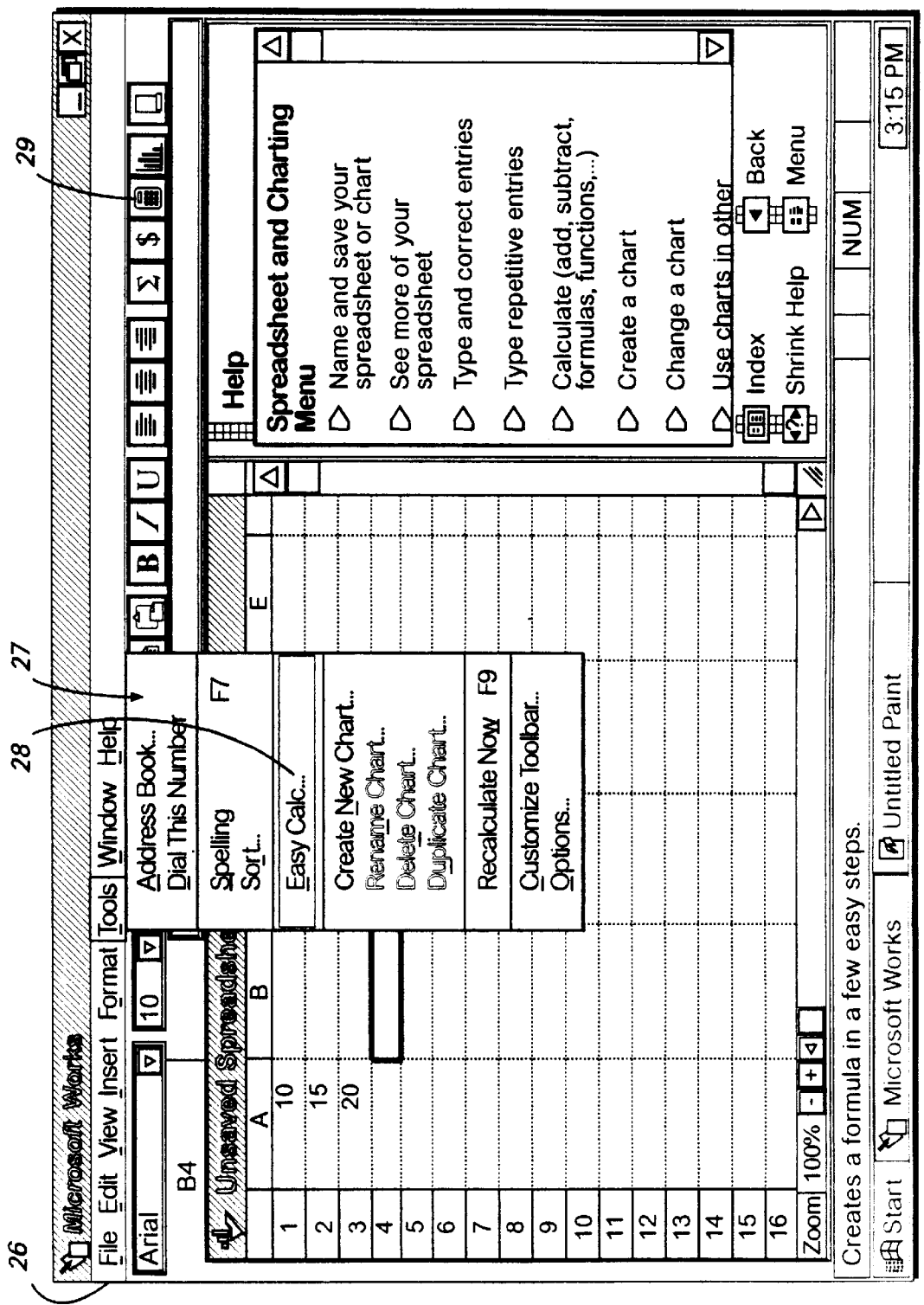
FIGS. 2–8 are examples of display screens used to facilitate the construction of a formula in a spreadsheet in accordance with the present invention.

The present invention comprises programming within the application program that assists the user when constructing and entering formulas within the spreadsheet. When the user is running the spreadsheet program on the computer system, a spreadsheet such as that shown in FIG. 2 is displayed on the display 22. The spreadsheet includes a plurality of individual cells, in columns identified from left to right in alphabetical order and rows identified from top to bottom in numerical order. Near the top of the display is a menu bar 26 that includes a plurality of menu items. Associated with the "Tools" menu item is a pull-down menu 27. One of the items in the pull-down menu 27 is the "Easy Calc" item 28. The Easy Calc menu item 28 is selected by the user to implement the method of the present invention to construct a formula in a cell in the spreadsheet. As is well known in connection with graphical user interfaces, the user selects a menu item by pointing and clicking the mouse at the Tools menu item and then dragging the mouse down the pull-down menu until the Easy Calc item is highlighted. Alternatively, the user can select the Easy Calc item by typing the menu item identifier. In FIG. 2, the character "E", shown underlined in the Easy Calc menu item, is the menu item identifier. As a still further alternative, the user can invoke Easy Calc by selecting the Easy Calc icon 29 displayed on the tool bar.

It should be understood that the method of the present invention can be accessed by any suitable means consistent with the graphical user interface associated with the computer system on which it is implemented. Therefore, the present invention should not be construed to be limited only to use with the graphical user interface elements described herein.

Figure 3:
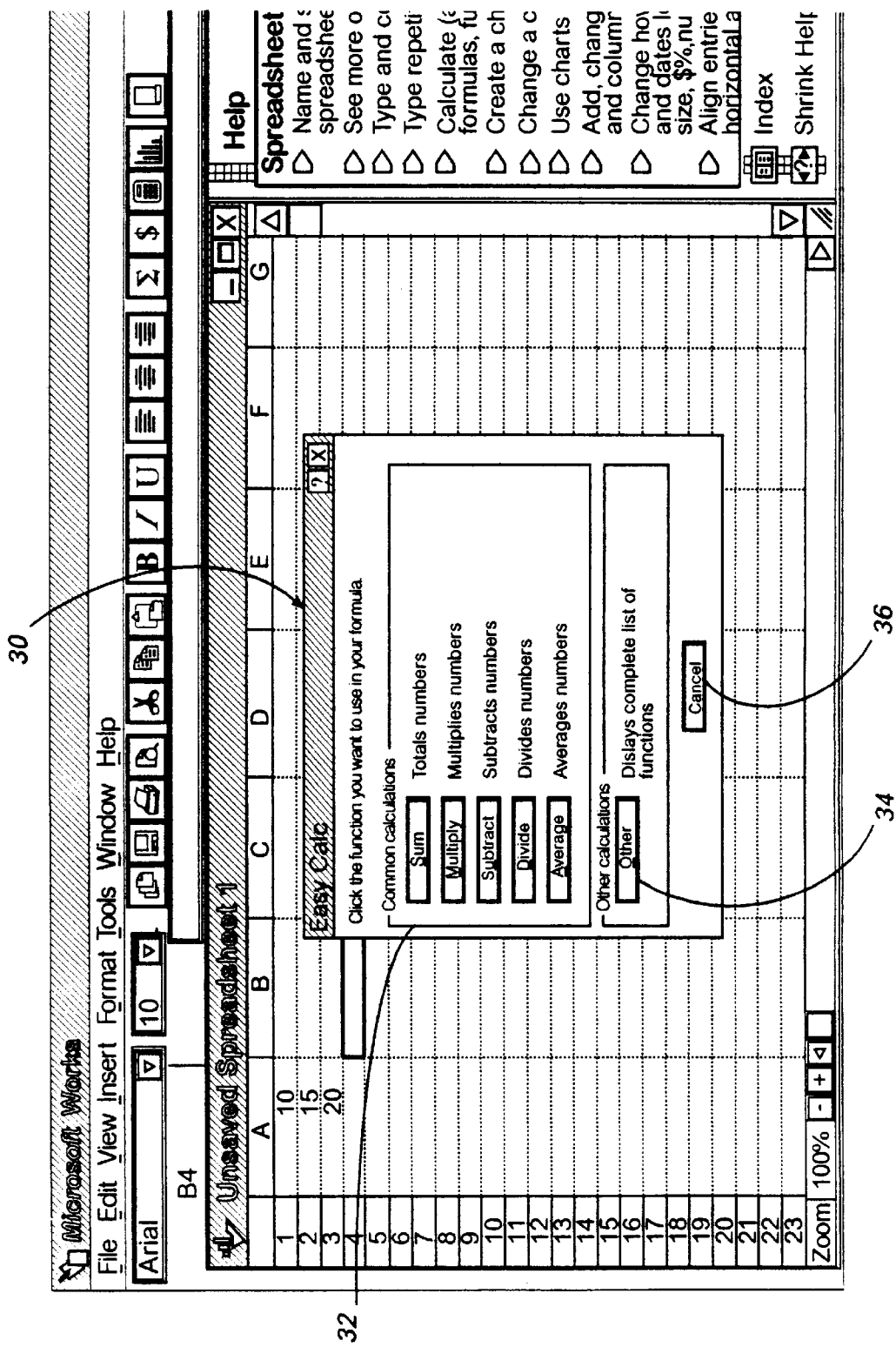

When the Easy Calc menu item is selected, a "function" dialog box, as shown at 30 in FIG. 3, is displayed. It should be understood that the function dialog box, as well as all other dialog boxes described herein, need not be limited in appearance to the appearance described and shown in the figures. Rather, any screen display that provides the functional capabilities described herein should be construed to be within the scope of the present invention.

The function dialog box 30 allows the user to choose a function to be entered in the formula. As shown in FIG. 3, the function dialog box displays buttons 32 associated with each of five common mathematical functions. The five buttons give the user the choice of choosing one of the five common functions: Sum, Multiply, Subtract, Divide, or Average. If the user does not choose to select from among the five common functions, the user may select the "Other" button 34. A "Cancel" button 36 is provided which closes the function dialog box, exits the Easy Calc operation, and returns the user to the spreadsheet.

Figure 4:
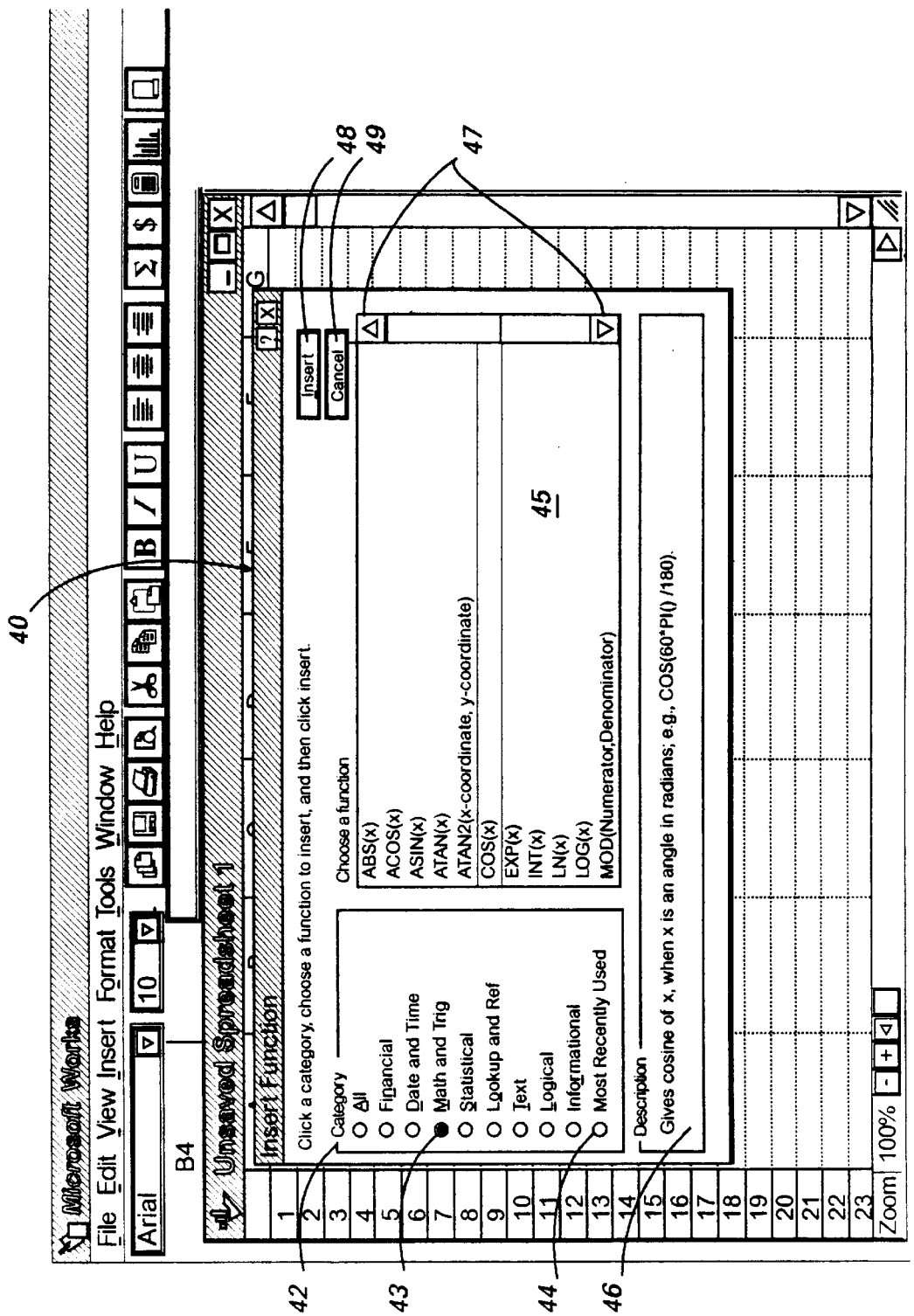

When the user selects the Other button 34, an "insert function" dialog box is displayed, as shown in FIG. 4 at 40. The insert function dialog box 40 displays various categories of available functions 42. In the preferred embodiment of the present invention, one of the categories displayed is the "most recently used" category 44 that includes the ten functions that were utilized most recently by the user. All other available functions, of which there are approximately 75, are grouped into the various other categories.

The user selects a category of functions by pointing and clicking the mouse on one of the category buttons associated with each category. When a category is selected, a list 45 of functions associated with the category is displayed to the user. The user highlights a function by pointing and clicking the mouse on the desired function in the list. As shown in FIG. 4, the user has selected the "Math and Trig" category 43 for listing mathematical and trigonometric functions. The list 45 of functions associated with the selected category is displayed and the user selects from among the functions in the list. In the example of FIG. 4, the user has highlighted the cosine function, designated as COS(x). When a function is highlighted, a textual description of the function is displayed in the description box 46.

The user can scroll through the list 45 of functions by pointing and clicking on the scroll arrows 47, as is well known in the art. The user can scroll through the list to highlight any other function, or select a new category to display another list of functions associated with the new category. When the user wants to select the highlighted function, the user selects the "Insert" button 48. A "Cancel" button 49 is provided which, when selected, exits Easy Calc and returns the user to the last displayed screen before invocation of Easy Calc.

Figure 5:
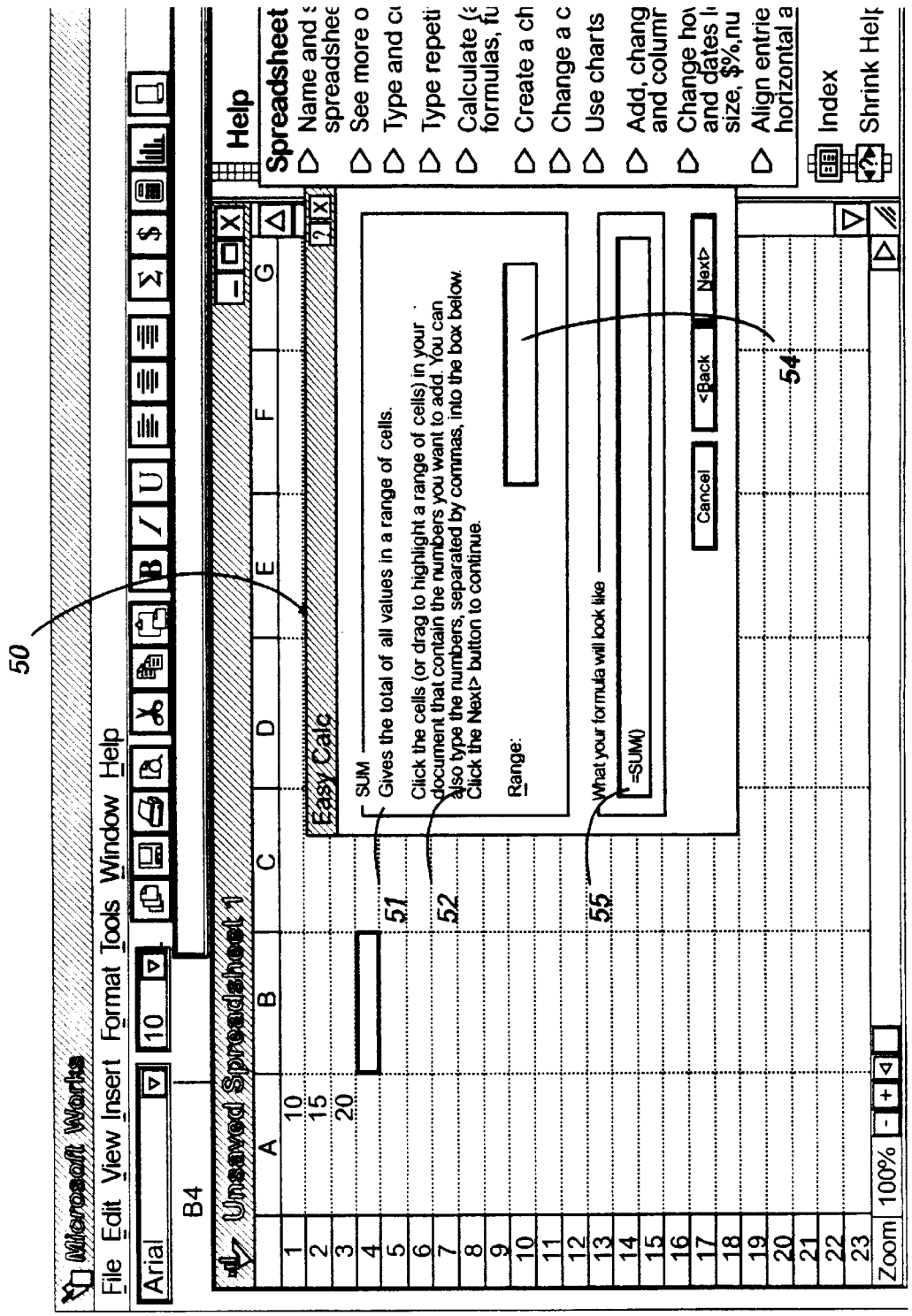

When the user selects a function, either by choosing from among the common functions 32 or by choosing another function using the Other button 34 and the dialog box shown in FIG. 4, a "parameter" dialog box is displayed. An example of a parameter dialog box associated with the SUM function (FIG. 3) is shown in FIG. 5 at 50. The parameter dialog box 50 includes a textual description 51 of the function and directions 52 for entering parameters into the function.

It should be understood that the contents of the parameter dialog box will be different depending on which function has been selected by the user. Although the parameter dialog box for the SUM function is shown in FIG. 5, it should be understood that a unique parameter dialog box exists for each function that is available to be utilized.

After the user has selected a function, data to be inserted into the function is entered in the parameter dialog box 50. As stated in the description 52, the user clicks cells in the spreadsheet or drags the cursor over a range of cells that contain data to be entered into the function. Alternatively, the user types the cell addresses containing data, or the user enters data directly, separated by commas in the range window 54. If the user wishes to enter data from a block of contiguous cells, the user types the address of the first and last cell in the contiguous block, separated by a colon, or, alternatively, the user can drag the mouse across the block of cells and the range will automatically be entered in the range window 54.

Figure 6:
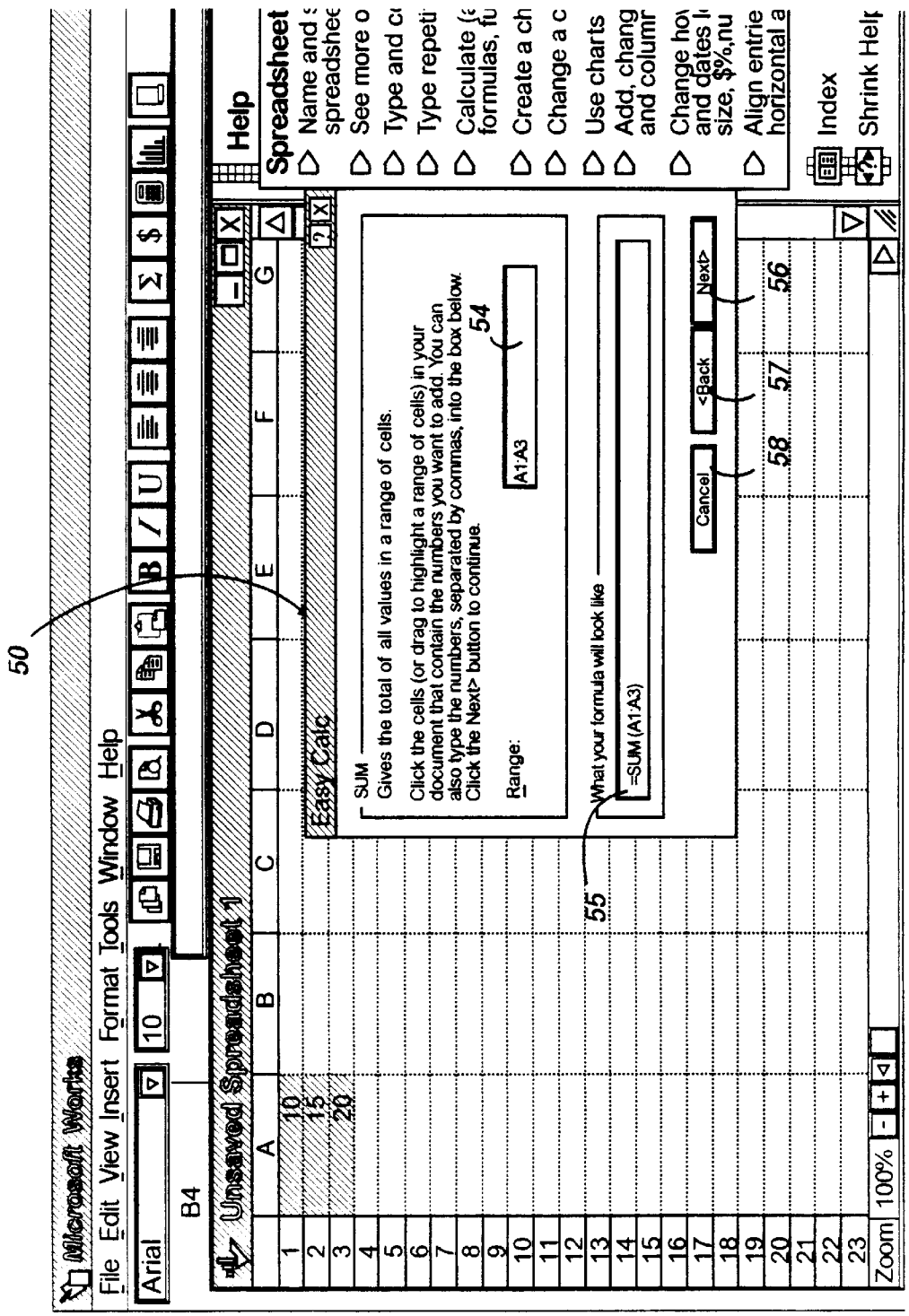

An example of the entry of parameters is shown in FIG. 6. If the user wants to add the numbers contained in cells A1, A2, and A3, the user either types in each individual cell address, clicks each individual cell, or drags the mouse over the contiguous block of cells A1–A3. FIG. 6 shows how the user can enter data by dragging the mouse over cells A1, A2, and A3. The contiguous block of cells A1–A3 is highlighted, and the range of cells is identified in the range window 54.

When the user enters parameters in the parameter dialog box, the resultant formula is displayed in the formula window 55. This allows the user to view the formula as it is being constructed. In the example shown in FIG. 6, the formula is displayed as SUM(A1:A3). This allows the user to see that the formula adds the data in cells A1 through A3.

After the user has selected all of the cell addresses that include data to be entered into the function, the user selects the "Next" button 56. If the user wants to exit the parameter dialog box without entering cell addresses and return to the most recent dialog box, the user selects the "Back" button 57, which returns the user to the function dialog box shown in FIG. 3., where focus will be on the last selected button in the function dialog box. If the user wishes to exit Easy Calc, the user selects the "Cancel" button 58.

The parameters that have been entered into the range window 54 may be edited by the user. A cursor is located in the range window, so the user can add or delete any parameter displayed in the range window using standard text editing techniques.

Figure 7:
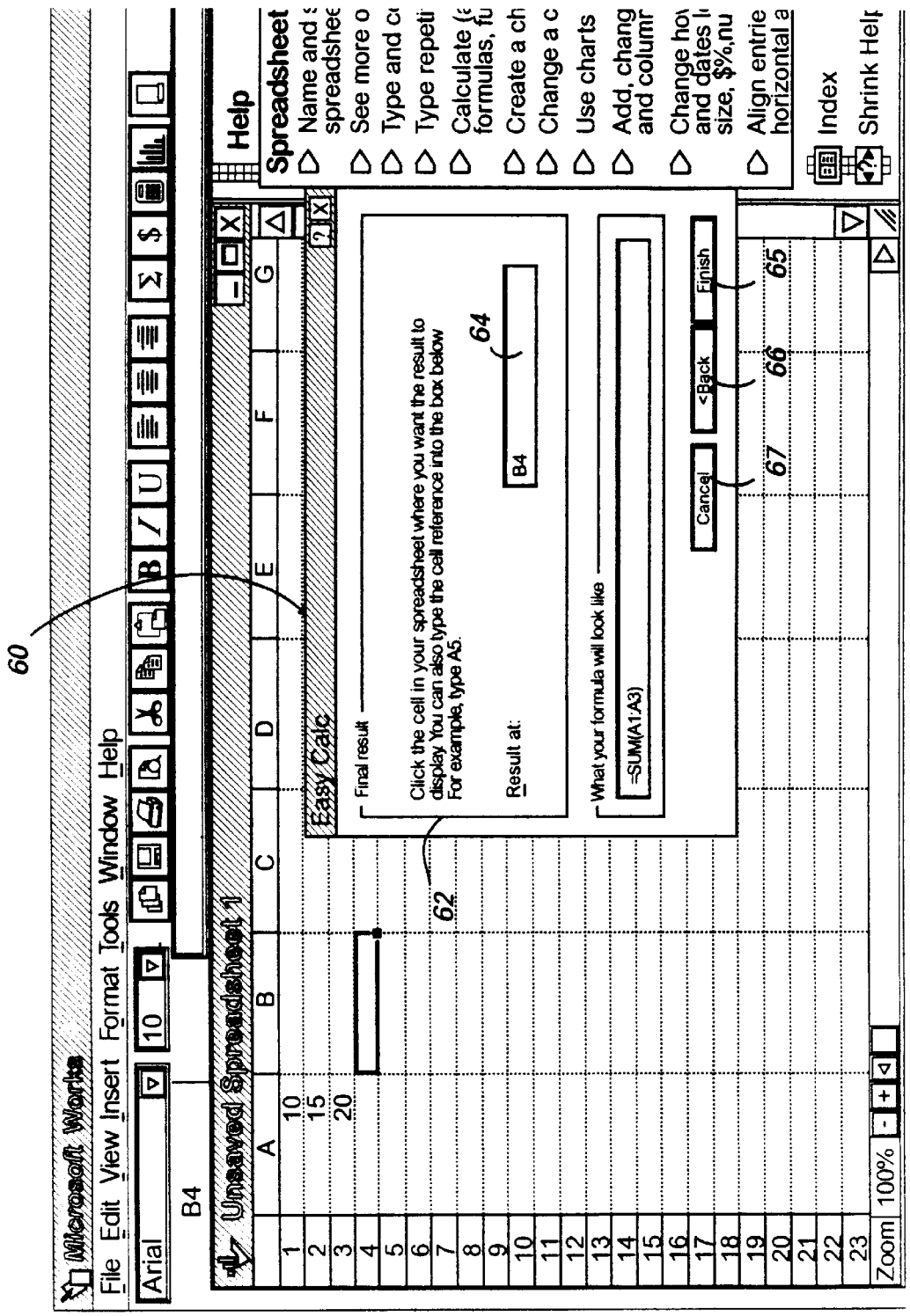

When the user has finished entering parameters into the function, the Next button 56 is selected and the parameter dialog box shown in FIG. 6 is removed from the display and the "result" dialog box 60 is displayed, as shown in FIG. 7. The result dialog box includes a textual description 62 that directs the user to enter the result cell in which the user wants the formula to be entered. The user then either clicks the cell or types the cell address of the desired result cell. The result cell entered by the user is displayed in the result window 64. If the user wants to return to the previously-displayed dialog box, the user selects the "Back" button 66. Selecting the Back button 66 closes the result dialog box 60 and causes the parameter dialog box 50 to be displayed again where focus is on the parameters that were previously entered in the range window 54. The "Cancel" button 67 exits Easy Calc.

The preferred embodiment of the present invention suggests a result cell and displays the suggested result cell in the result window 64. The suggested result cell is the current cell, which is the cell that was highlighted when the Easy Calc menu item was selected. The highlighted cell is displayed in a manner, such as with a thickened border around the boundaries of the cell, to indicate to the user that data can be entered in the cell. In the example described above, it is seen in FIG. 2 that cell B4 was highlighted when the Easy Calc item was selected. Thus, in the result dialog box shown in FIG. 7, the cell B4 is displayed in the result window 64 as the suggested result cell.

Figure 8:
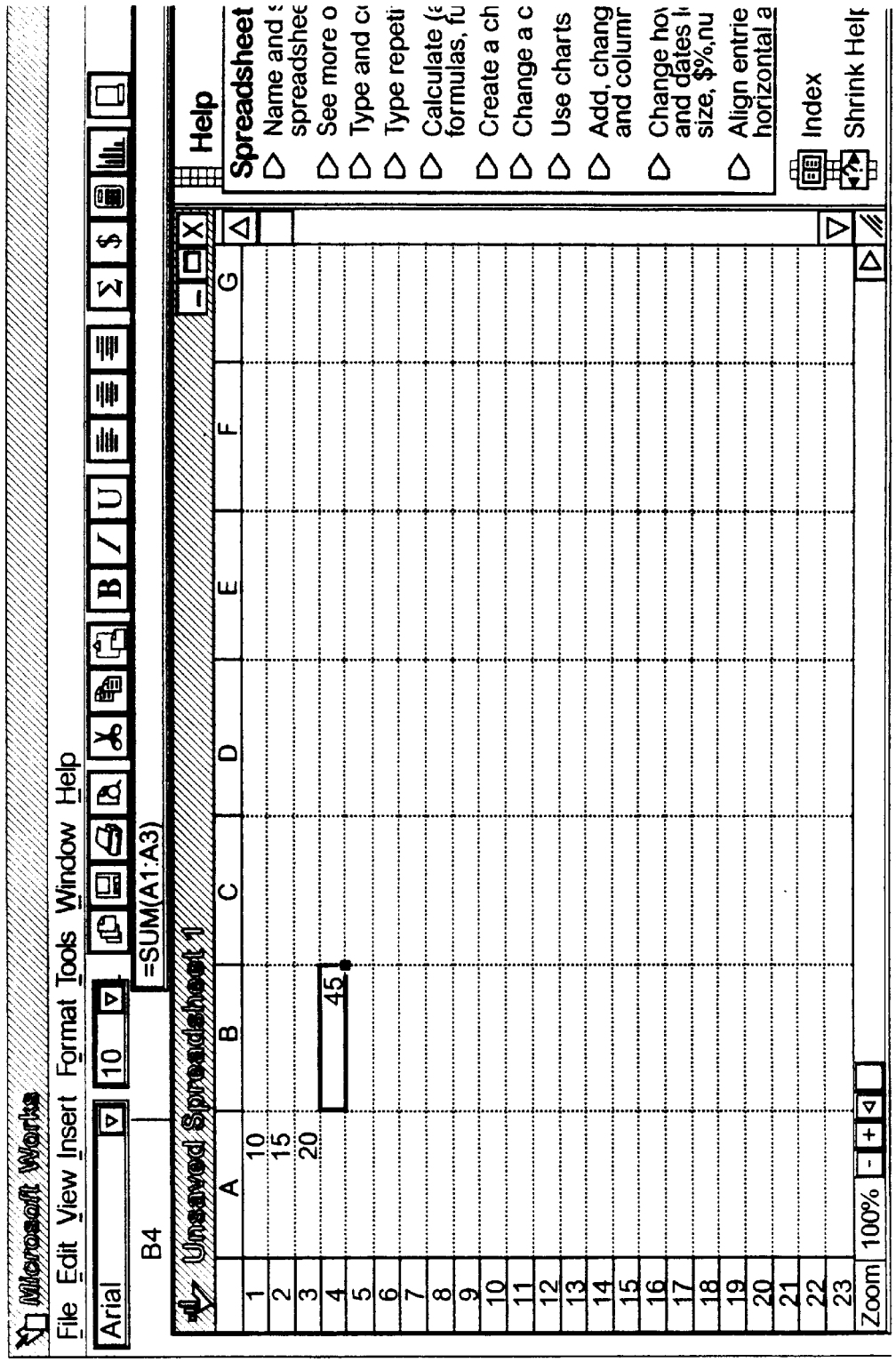

If the user wants to enter the formula in the suggested result cell, the user selects the "Finish" button 65. When the Finish button is selected, the result dialog box is removed from the display screen, and the formula is entered in the result cell. The result cell displays the mathematical result of the formula. In the example described above, the formula entered in cell B4 adds the data in cells A1, A2, and A3. Because cells A1, A2, and A3 contain the numbers 10, 15, and 20, respectively, the result of the formula contained in cell B4 is displayed. FIG. 8 shows the result dialog box removed from the display and the result of the formula displayed in cell B4 as the number "45".

When the parameter dialog box is displayed, as shown in FIG. 5, suggested parameters may be displayed in the range window 54. Suggested parameters, in the form of cell addresses, are displayed in association with some, but not all, functions. For example, of the five common functions (SUM, MULTIPLY, SUBTRACT, DIVIDE, AVERAGE) only the SUM and AVG functions may display suggested parameters in the range window of the parameter dialog box.

Even for functions for which suggested parameters may be displayed, suggested parameters may not always be displayed. Suggested parameters are displayed depending on the location of the current cell and the contents of cells in the same column above the current cell and in the same row to the left of the current cell. If the cell located adjacent to and above the current cell in the same column is filled with data, then the suggested parameters will include the contiguous block of cells beginning from the adjacent cell and including all contiguous cells to the left that are filled.

If the above adjacent cell is empty, then the adjacent cell to the left of the current is examined. If the cell located adjacent and to the left of the current cell in the same row is filled with data, then the suggested parameters will include the contiguous block of cells beginning from the adjacent cell and including all contiguous cells above that are filled.

Figure 9:
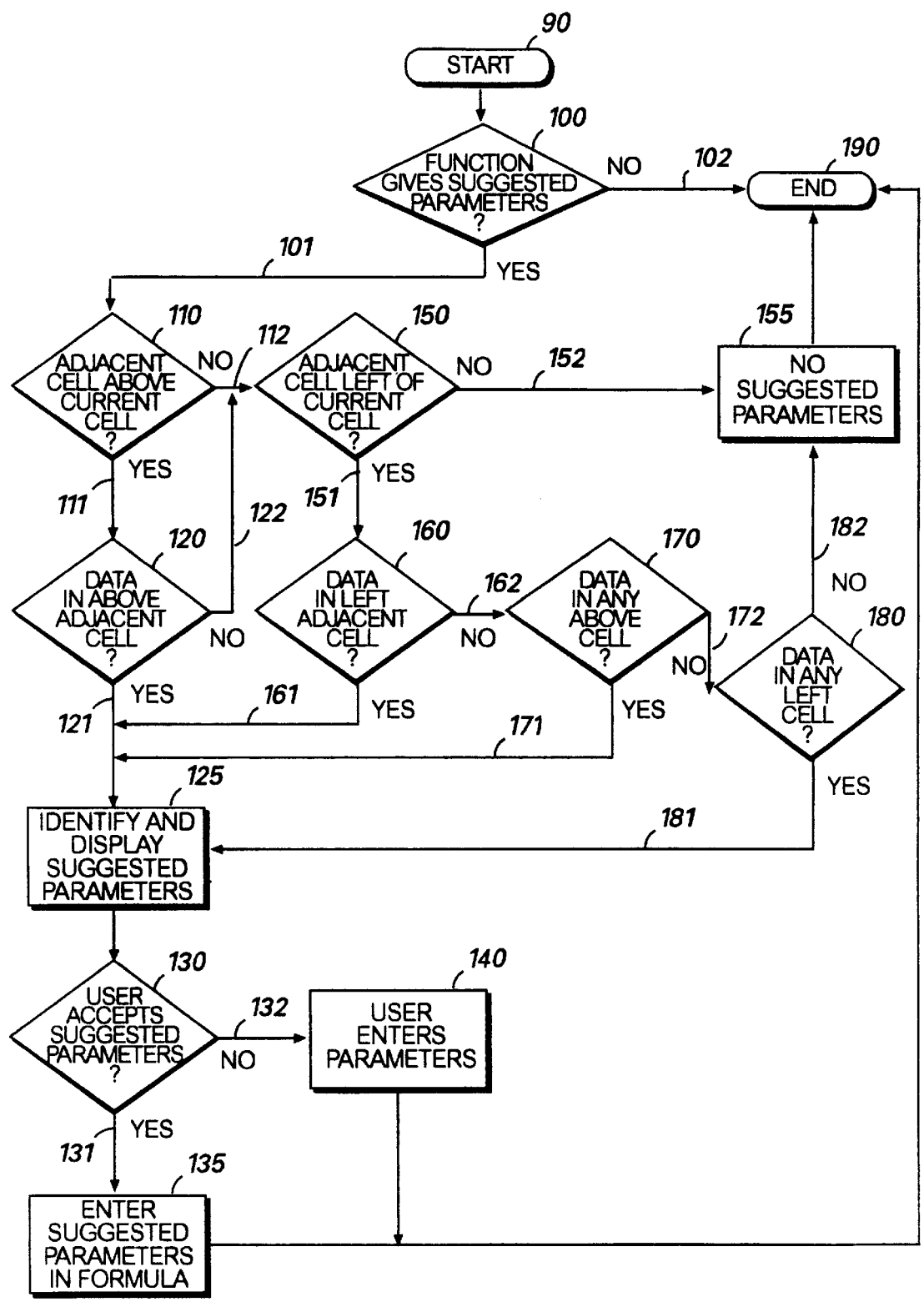
FIG. 9 is a flow chart showing the method of identifying and displaying suggested parameters.

The method of determining and displaying suggested parameters is better described with reference to the flow chart of FIG. 9. The method begins at 90. At step 100, it is determined whether the function that has been selected is one of the types for which suggested parameters are identified. If the function is not a type for which the inventive method provides suggested parameters, the method follows "no" branch 102, and the method terminates at 190. If it is determined, at step 100, that the function is a type for which parameters are suggested, the method follows "yes" branch 101 to step 110.

At step 110, it is determined whether there is a cell located above and adjacent to the current cell in the same column as the current cell. If an adjacent cell is not located above the current cell, the method follows "no" branch 112 to step 150.

If an adjacent cell is located above the current cell, the method follows "yes" branch 111 to step 120. At step 120, it is determined whether data is contained in the above adjacent cell. If data is not contained in the above adjacent cell, the method follows "no" branch 122 to step 150. However, if data is contained in the adjacent cell above the current cell, the method follows "yes" branch 121 and proceeds to step 125.

At step 125, the method identifies and displays the suggested parameters in the range window of the parameter dialog box. The method then proceeds to step 130, where it is determined whether the user accepts the suggested parameters. The user accepts the suggested parameters by selecting the Next button in the parameter dialog box. If the user accepts the suggested parameters, the method follows "yes" branch 131 to step 135, where the suggested parameters are entered in the formula. The method associated with suggested parameters then terminates at 190.

If the user does not accept the suggested parameters, as determined at step 130, the method follows "no" branch 132 to step 140. At step 140, the user enters parameters either by pointing and clicking on cells or by typing in cell address or data into the range window in the parameter dialog box. The method then terminates at 190.

At step 150, it is determined whether a cell is located immediately adjacent and to the left of the current cell in the same row. If no cell is located to the left of the current cell, the method follows "no" branch 152, and the method proceeds to step 155 where no parameters are suggested. The method then terminates at 190.

If it is determined at step 150 that a cell is located immediately adjacent and to the left of the current cell, the method follows "yes" branch 151 to step 160 where it is determined whether data is contained in the adjacent cell. If it is determined at step 160 that data is contained in the adjacent cell to the left of the current cell, the method follows "yes" branch 161 to step 125 where the method identifies the suggested parameters as the contiguous block of cells beginning with the adjacent cell to the left of the current cell and including all contiguous filled cells. The cell addresses of the block of cells containing data are displayed in the range window of the parameter dialog box as the suggested parameters. The method then proceeds to step 130. If data is not contained in the adjacent cell, as determined at step 160, the method follows "no" branch 162, and the method proceeds to step 170.

At step 170, it is determined whether data is contained in any cell in the same column above the current cell. If data is contained in any cell above the current cell, the method follows "yes" branch 171 to step 125 where suggested parameters are displayed as the contiguous block of cells beginning from the adjacent cell and extending to the filled cell underneath the next empty cell. An example of this situation is shown in FIG. 10F. If no cell above the current cell in the same column contains data, the method follows "no" branch 172 to step 180.

Similarly, at step 180, it is determined whether data is contained in any cell in the same row and to the left of the current cell. If data is contained in any cell in the same row and to the left of the current cell, the method follows "yes" branch 181 to step 125 where suggested parameters are displayed as the contiguous block of cells beginning from the adjacent cell and extending to the filled cell to the right of the next empty cell. An example of this situation is shown in FIG. 10G. If no cell in the same row to the left of the current cell contains data, the method follows "no" branch 182 to step 155.

The method of identifying and displaying suggested parameters is further described with reference to FIGS. 10A–G. FIGS. 10A–G show various examples of cells in a spreadsheet that are identified as suggested parameters, in accordance with the present invention. In each figure, the current cell is shown with a thickened border.

Figure 10A:
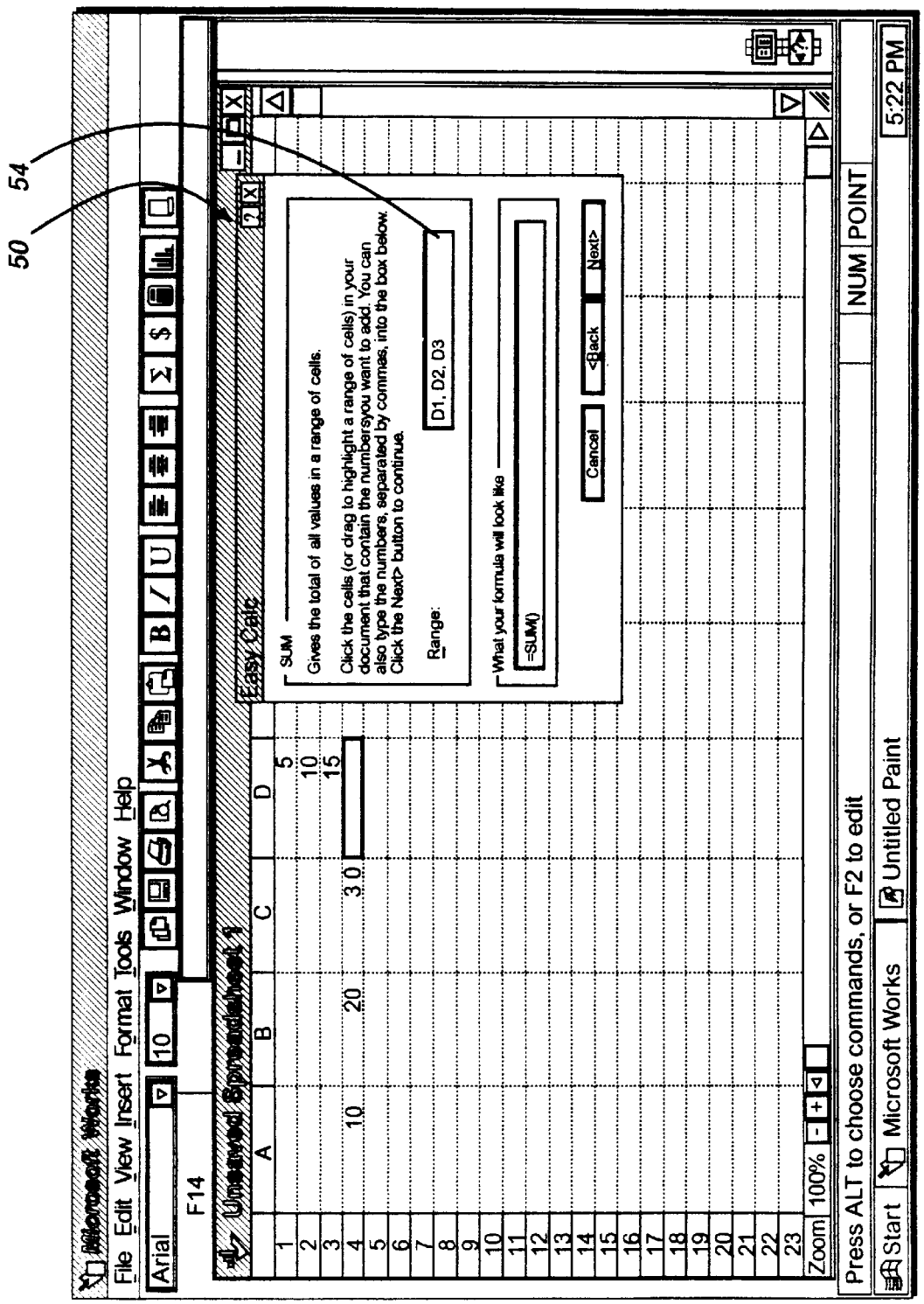
FIGS. 10A–G are examples of display screens showing the identification and display of suggested parameters in accordance with the present invention.

In FIG. 10A, the current cell is cell D4, as evidenced by the thickened lines around the cell's periphery. Cells D1, D2, and D3 in column D are filled with numerical data. In row 4, cells A4, B4, and C4 are likewise filled with numerical data. If Easy Calc is invoked and if the SUM function is selected, then suggested parameters will be displayed in the range window 54 of the parameter dialog box 50.

Because the adjacent cell above the current cell (cell D3) is filled with data, the suggested parameters will be the contiguous block of cells beginning with the adjacent cell and including all contiguous filled cells in the column. Thus, the suggested parameters for the spreadsheet in FIG. 10A are cells D1, D2, and D3, as displayed in the range window 54.

It should be understood that the present invention examines the cells above the current cell prior to examining cells to the left of the current cell. Therefore, even though the adjacent cells to the left of the current cell are filled in FIG. 10A, the suggested parameters are not identified as those to the left of the current cell because priority is given to the cells above the current cell.

Figure 10B:
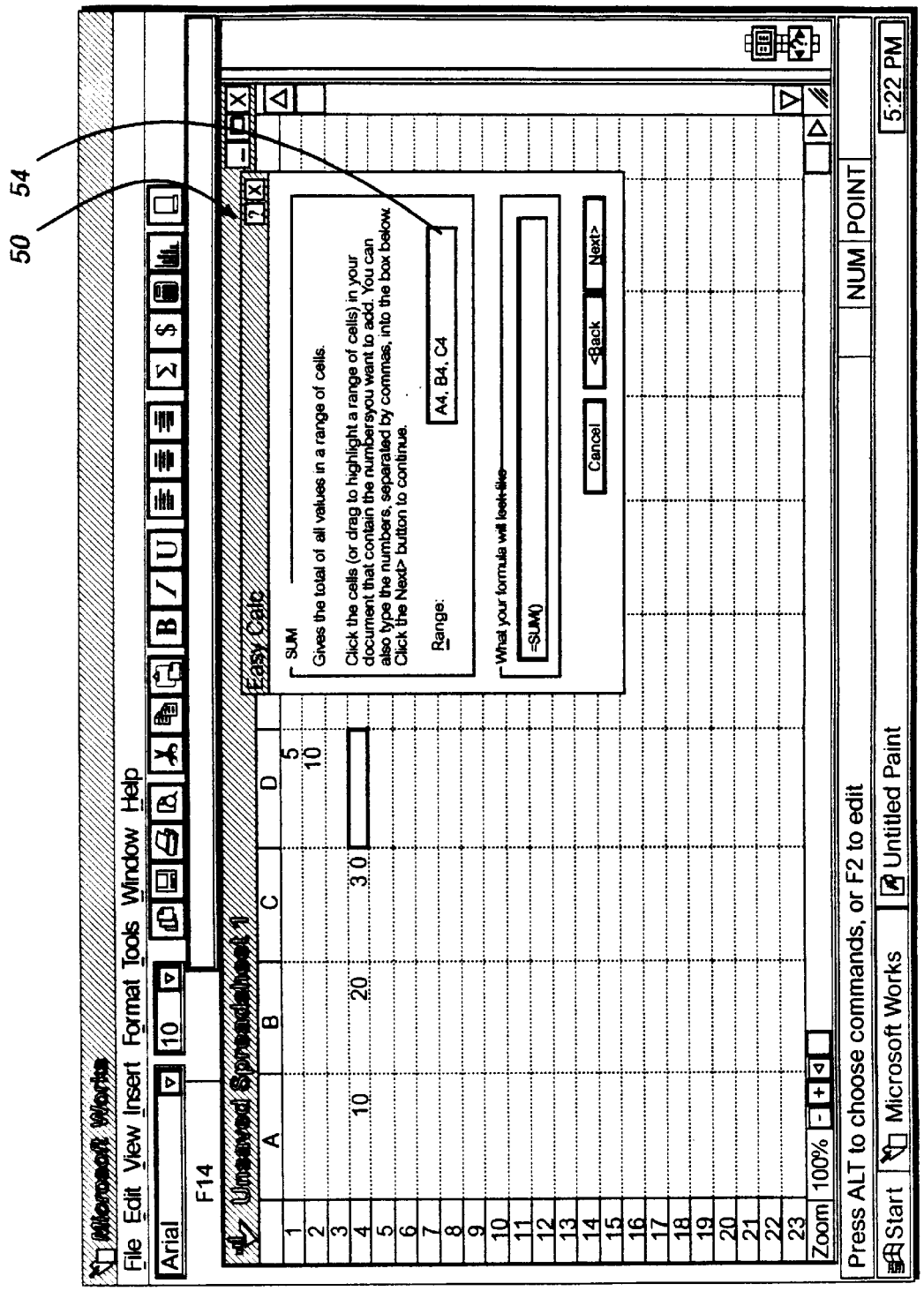

In FIG. 10B, the current cell is cell D4. The adjacent cell above the current cell is empty and the adjacent cell to the left of the current cell is filled. Therefore, the suggested parameters are identified and displayed as the block of cells beginning with the adjacent cell and including all contiguous filled cells. Thus, the suggested parameters are cells A4, B4, and C4.

Figure 10C:
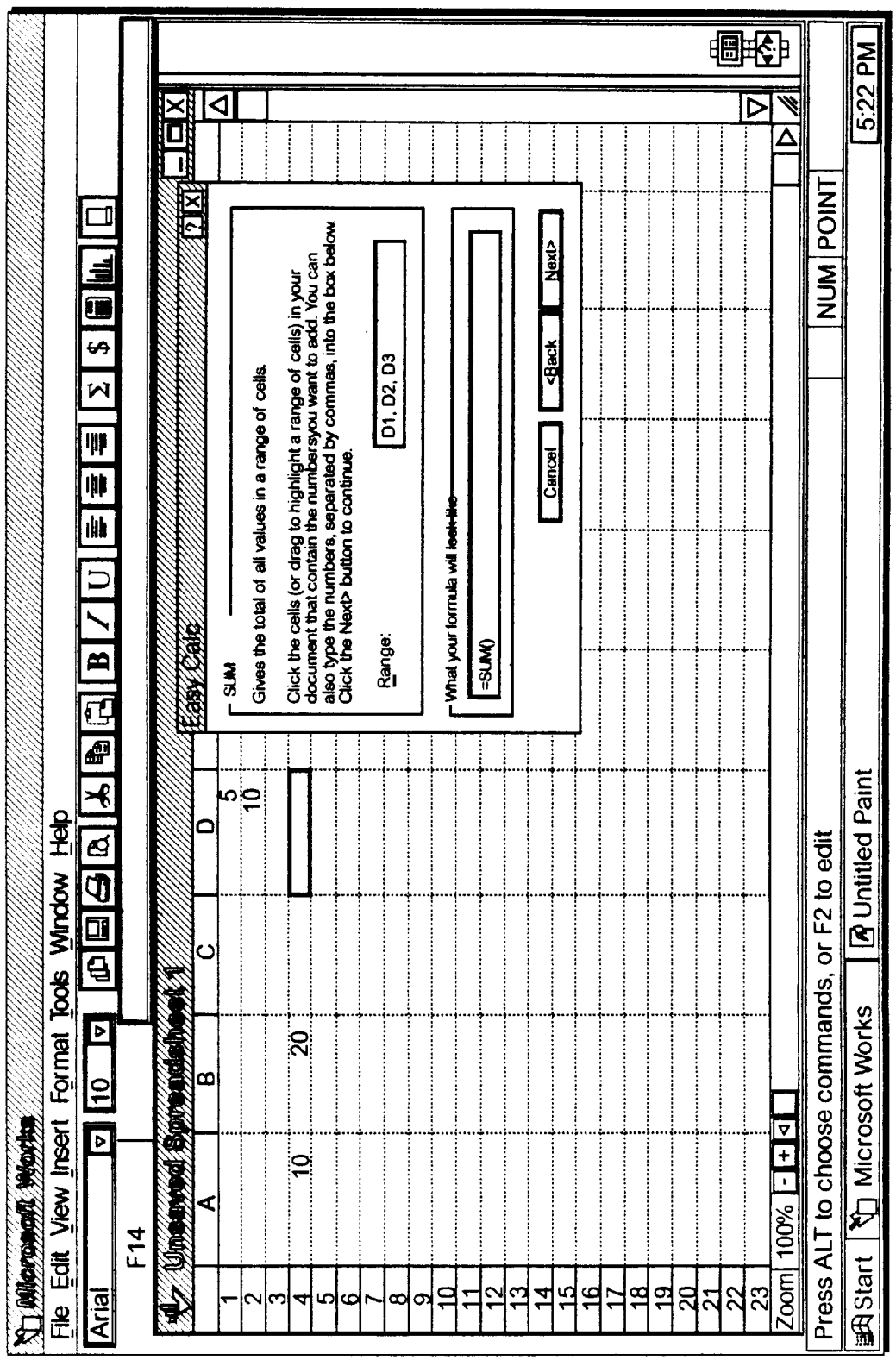

In FIG. 10C, the current cell is again cell D4. Both the adjacent cell above the current cell and the adjacent cell to the left of the current cell are empty. Each cell above the empty adjacent cell above the current cell and each cell to the left of the empty adjacent cell to the left of the current cell are filled. When the adjacent cell above the current cell and the adjacent cell to the left of the current cell are empty, the cells above the current cell are examined to determine if any cell above the current cell in the same column contains data. If so, the suggested parameters include the contiguous block of cells from the adjacent empty cell up to the first cell containing data and any contiguous cells that contain data. In FIG. 10C, the suggested parameters include the empty adjacent cell (cell D3), the first cell above the adjacent cell that contains data (cell D2), and all other contiguous cells above cell D2 that also contain data (cell D1). Thus, in the spreadsheet of FIG. 10C, the suggested parameters include cells D1, D2, and D3. Similarly, in the spreadsheet of FIG. 10E, the suggested parameters include cells D1, D2, and D3.

Similarly, in FIG. 10F, the suggested parameters include the empty adjacent cell and the contiguous block of cells that are filled. Because the contiguous block of filled cells above the adjacent cell includes only cells D4 and D5, the suggested parameters for the spreadsheet shown in FIG. 10F are cells D4, D5, and D6.

Figure 10D:
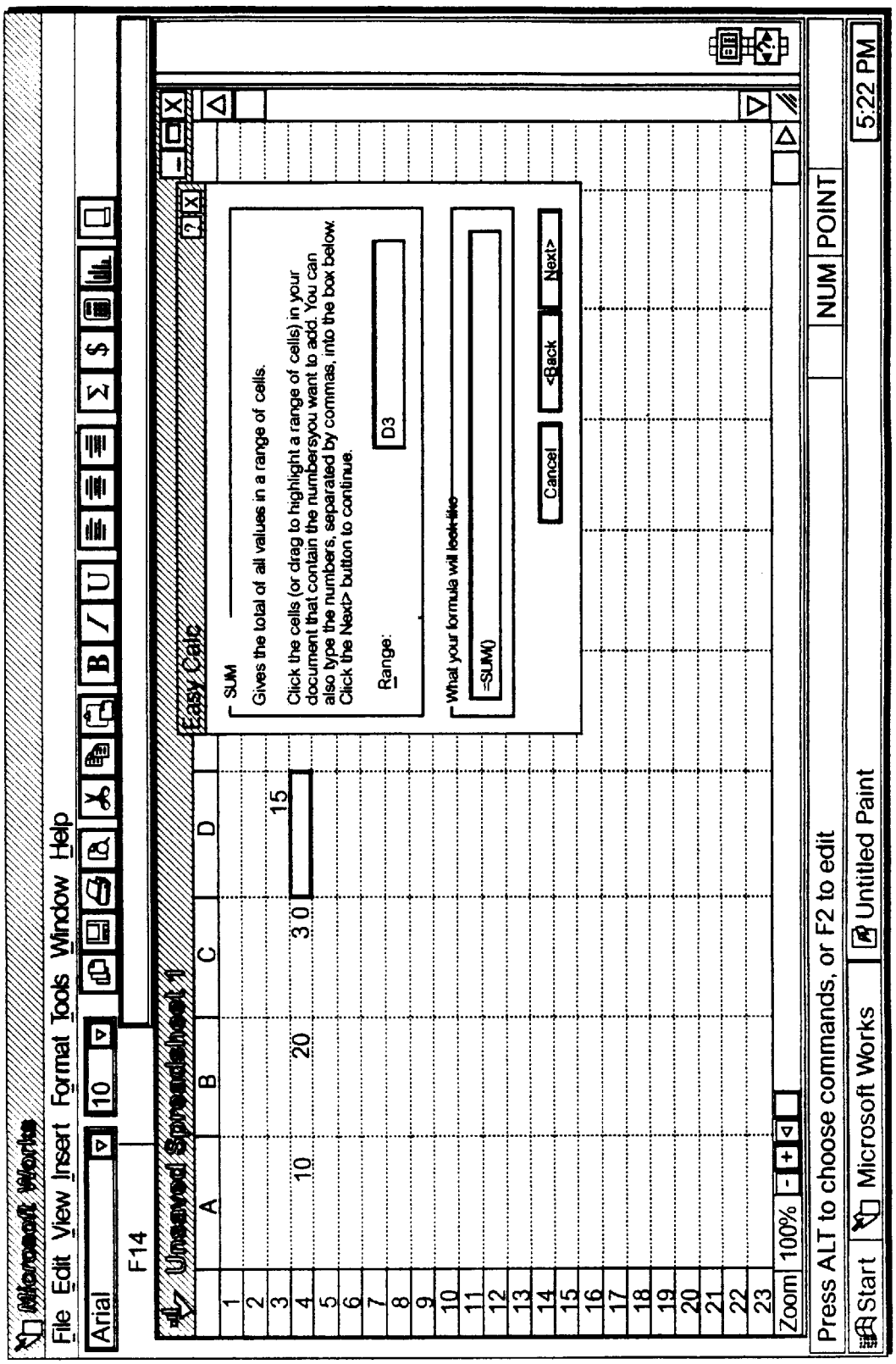
Figure 10E:
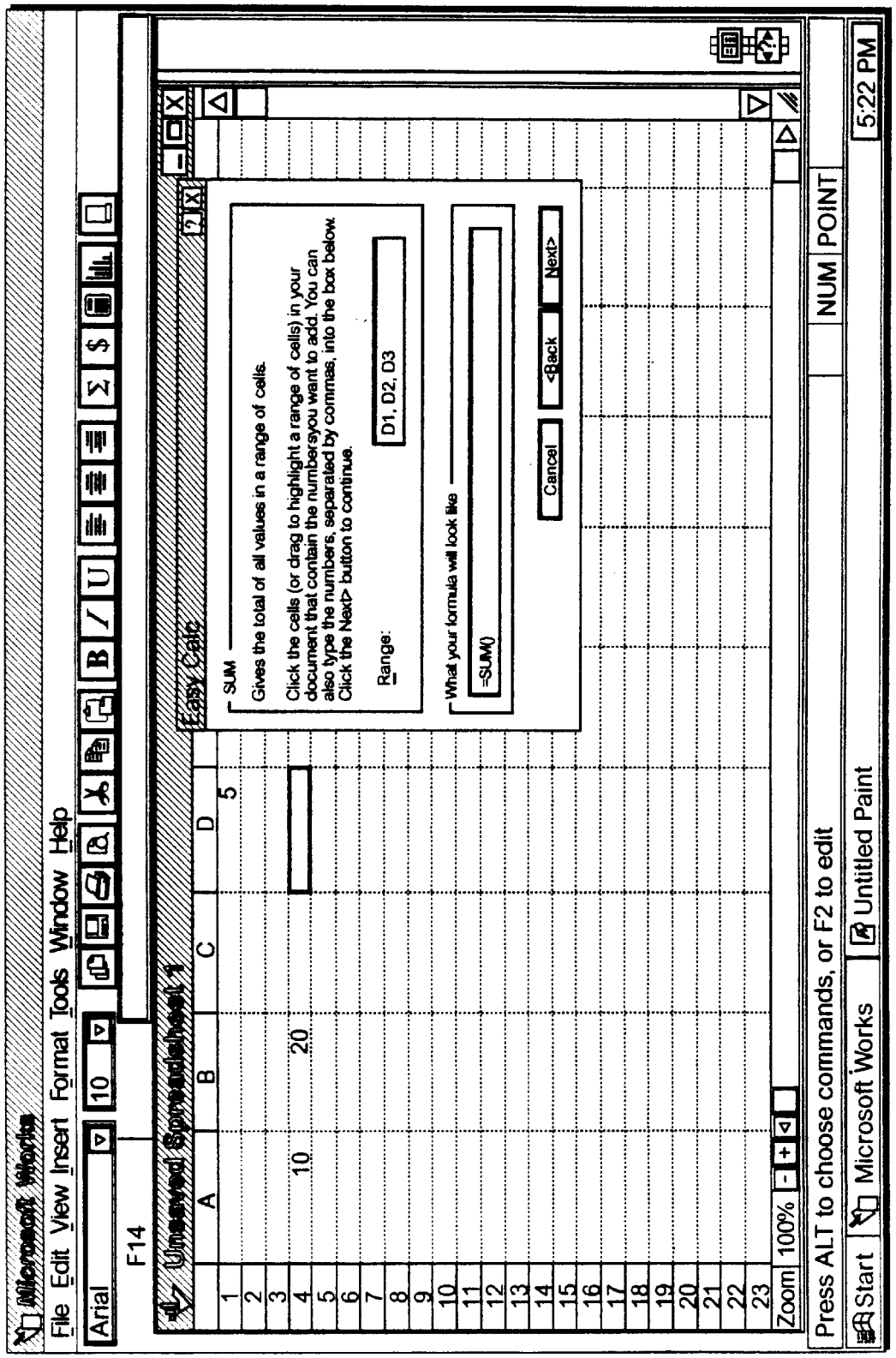
Figure 10F:
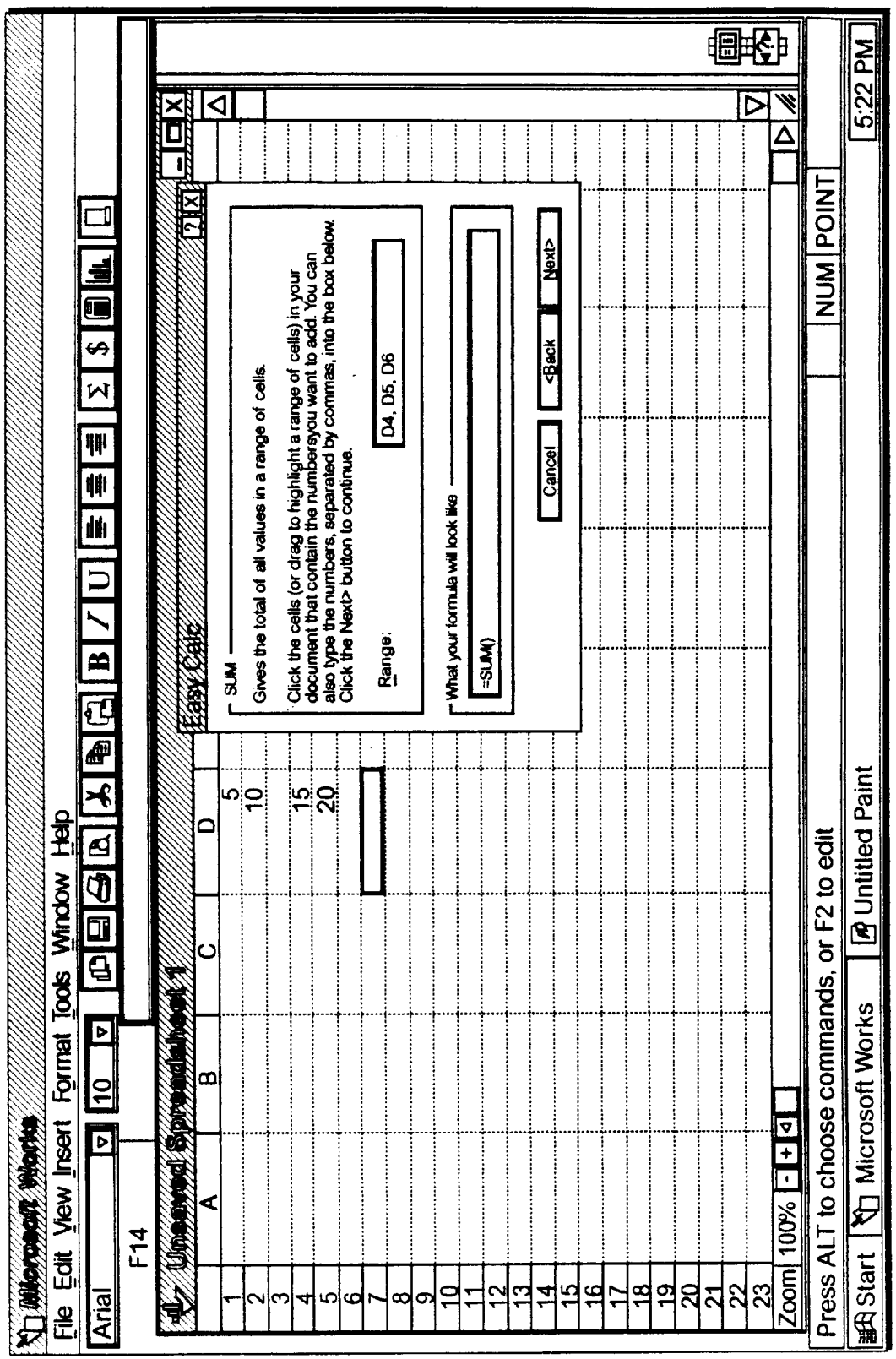
Figure 10G:
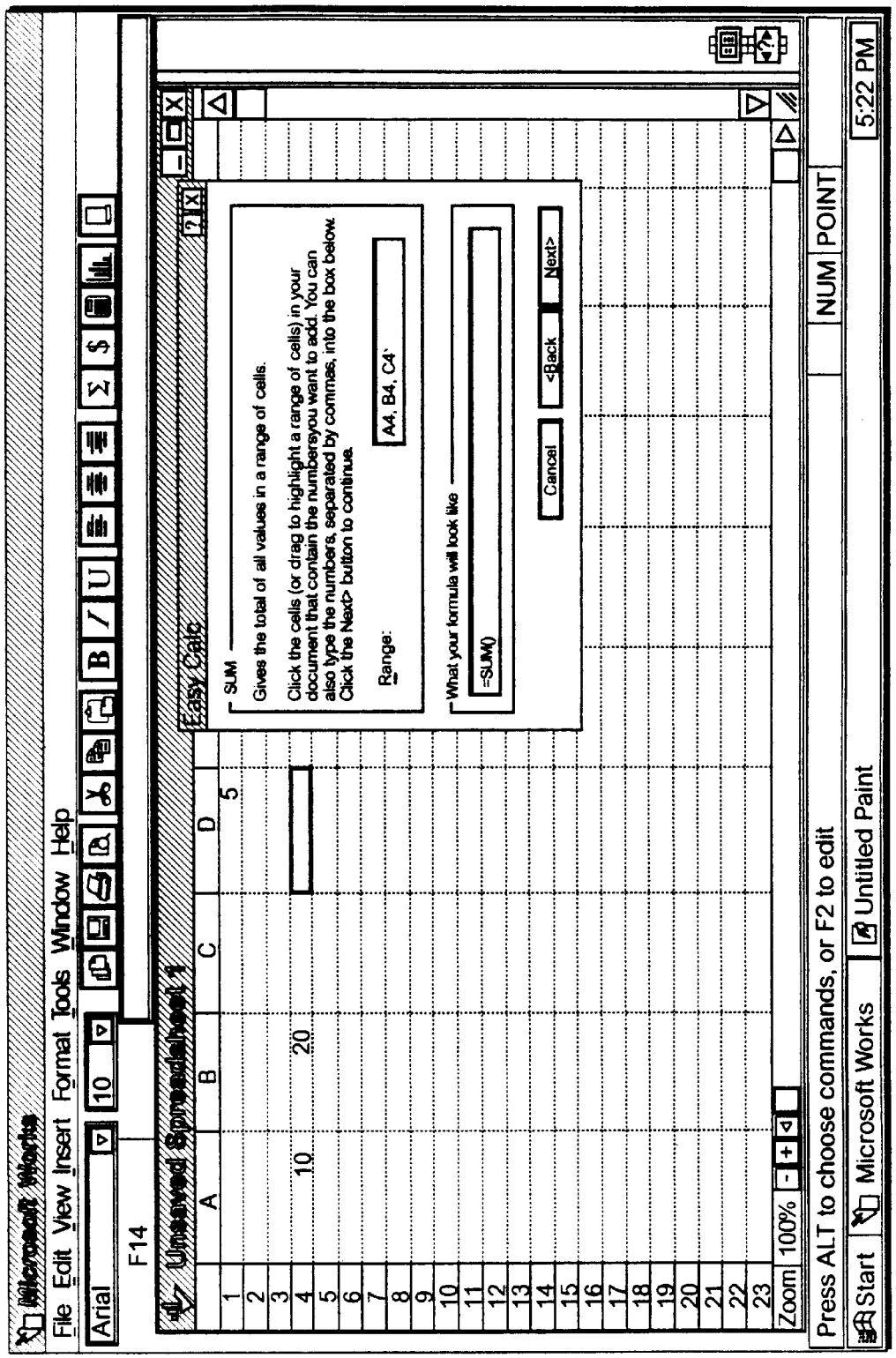

The spreadsheet displayed in FIG. 10D demonstrates that the suggested parameters are not based on the length of the contiguous block of cells. FIG. 10D shows a three cell block of cells to the left of the current cell and only a one cell block above the current cell. Because the suggested parameters are identified based on their location relative to the current cell rather than based on the size of the contiguous block of filled cells, the suggested parameters for the spreadsheet shown in FIG. 10D includes only cell D3.

FIG. 10G shows a spreadsheet in which all cells above the current cell are empty and the adjacent cell to the left of the current cell is empty. In this case, the suggested parameters include the empty adjacent cell and the contiguous block of filled cells to the left of the adjacent cell. Thus, the suggested parameters for the spreadsheet of FIG. 10G are cells A4, B4, and C4.

Figure 11:
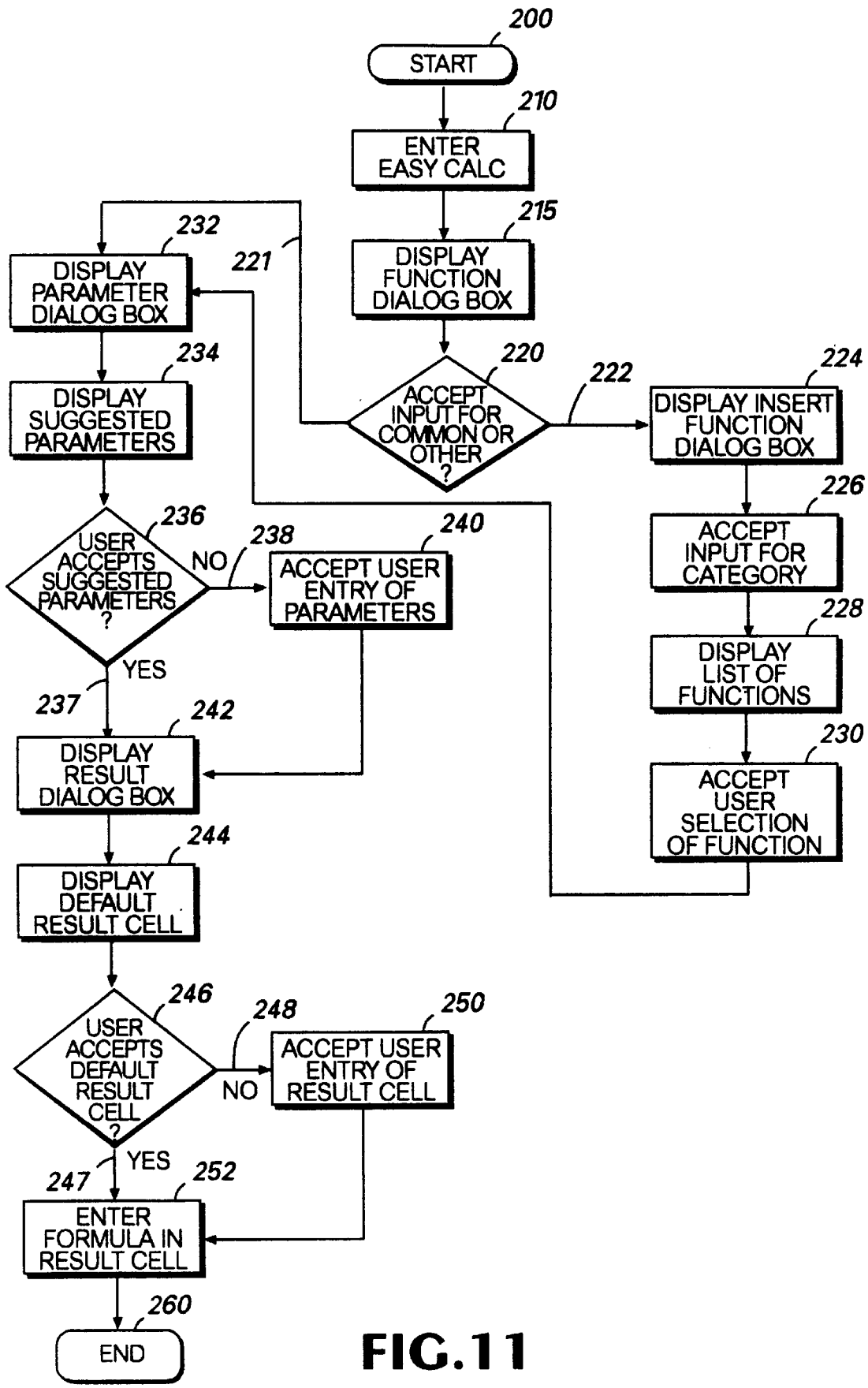
FIG. 11 is a flow chart showing the method of constructing a formula in a cell in a spreadsheet.

The method of constructing formulas in a cell of a spreadsheet, as discussed above, is also described with reference to the flow chart of FIG. 11. The method begins at 200. At step 210, the method accepts user input to utilize the Easy Calc method of constructing formulas. At step 215, the method displays a function dialog box on the display screen. At step 220, it is determined whether input is received from the user selecting one of the five common functions displayed in the function dialog box or selecting other functions. If input is received from the user selecting a common function, the method follows branch 221 and proceeds to step 232. If input is received from the user for other functions, then the method follows branch 222 and proceeds to step 224.

At step 224, the method displays the insert function dialog box with a list of categories and a list of category-related functions. At step 226, the method accepts user input choosing a category and, at step 228, displays a list of functions corresponding to the selected category. At step 230, the method accepts the selection of a function in the list and then proceeds to step 232.

At step 232, the method displays the parameter dialog box associated with the selected function. At step 234, the method determines and displays the suggested parameters, if any, associated with the selected function and the configuration of data in the cells of the spreadsheet. Suggested parameters, if any, are displayed in the range window of the parameter dialog box.

At step 236, it is determined whether input is received from the user accepting the suggested parameters. If the user accepts the selected parameters, the method follows "yes" branch 237 to step 242. If the user does not accept the suggested parameters, the method follows "no" branch 238 and proceeds to step 240. At step 240, the method accepts the entry of parameters selected by the user. The method then proceeds to step 242.

At step 242, a result dialog box is displayed. At step 244, the location of the default result cell is displayed in the result window of the result dialog box. The default result cell is identified as the current cell that was highlighted when Easy Calc was initiated by the user. At step 246, it is determined whether input is received from the user accepting the default result cell. If the user accepts the default result cell, the method follows "yes" branch 247 to step 252. If the user does not accept the default result cell, the method follows "no" branch 248 to step 250 where input is received from the user's selection of the desired result cell. The method then proceeds to step 252.

At step 252, the formula, as constructed, is entered, and the result of the formula is calculated and displayed in the result cell. The method then terminates at 260.

In summary, the present invention provides a method and system that assists a user in the construction of a formula in a cell of a spreadsheet. The present invention allows the user to construct a formula in discrete steps and aids the user by displaying a dialog box at each step of the formula construction process. Each respective dialog box prompts the user to select a function, parameters, and a result cell location for the formula being constructed. Thus, the user can construct a formula without having to enter the arcane syntax typically associated with spreadsheet formulas.

From the foregoing, it will be appreciated that the preferred embodiment of the present invention overcomes the drawbacks of the prior art described hereinabove. From the description of the preferred embodiment, equivalents of the elements shown therein will suggest themselves to those skilled in the art and ways of constructing other embodiments of the present invention will suggest themselves to practitioners of the art. Therefore, the scope of the present invention is to be limited only by the claims below.

What is claimed is:

1. In association with a computer system, a method for constructing a formula in a cell of a spreadsheet, comprising the steps of:
   displaying a first dialog box that lists selectable functions;
   accepting the selection of one of the functions for insertion into the formula;
   displaying a second dialog box for the selection of parameters for the selected function;
   accepting the selection of parameters; and
   inserting the resultant formula into a result cell.

2. The method of claim 1 further comprising, before said inserting step:
   displaying a third dialog box for selecting the result cell in which the formula is to be placed; and
   accepting the selection of the desired result cell.

3. The method of claim 2 wherein a default result cell is identified as the current cell.

4. The method of claim 1 wherein the first dialog box includes a description of the selected function.

5. The method of claim 1 wherein the first dialog box includes instructions for selecting parameters.

6. The method of claim 1 wherein the first dialog box lists a plurality of predetermined, commonly-used functions.

7. The method of claim 6 wherein other functions are displayed by selecting a button in the first dialog box.

8. The method of claim 7 wherein the other functions are displayed in lists associated with a plurality of categories of functions.

9. The method of claim 8 wherein one category displays a predetermined number of functions that have been most recently selected.

10. The method of claim 1 wherein the parameters include at least one cell address identifying a cell in the spreadsheet.

11. The method of claim 10 wherein the cell address is selected by clicking on the cell with a mouse.

12. The method of claim 10 wherein the parameters include a contiguous block of cells that are selected by dragging a mouse over the block of cells.

13. The method of claim 10 wherein the parameters are selected by typing the cell addresses on a keyboard.

14. The method of claim 1 wherein the second dialog box displays suggested parameters.

15. The method of claim 14 wherein the suggested parameters include cells in the same column above the current cell including the cell adjacent to the current cell and all contiguous cells filled with data.

16. The method of claim 14 wherein the suggested parameters include cells in the same row to the left of the current cell including the cell adjacent to the current cell and all contiguous cells filled with data.

17. A computer system, including a program module that displays cells of a spreadsheet on a display, for constructing a formula in a cell of said spreadsheet, comprising:
   means for displaying a first dialog box that lists selectable functions;
   means for accepting the selection of one of said functions for insertion into said formula;
   means for displaying a second dialog box for the selection of parameters for said selected function;
   means for accepting the selection of said parameters; and
   means for inserting the resultant formula into a result cell.

18. The system of claim 17 further comprising:
   means for displaying a third dialog box for selecting said result cell in which said formula is to be placed; and
   means for accepting the selection of said desired result cell.

19. The system of claim 18 wherein a default result cell is identified as the current cell.

20. The system of claim 17 wherein said first dialog box includes a description of said selected function.

21. The system of claim 17 wherein said first dialog box includes instructions for selecting said parameters.

22. The system of claim 17 wherein said first dialog box lists a plurality of predetermined, commonly-used functions.

23. The system of claim 22 wherein other functions are displayed by selecting a button in said first dialog box.

24. The system of claim 23 wherein said other functions are displayed in lists associated with a plurality of categories of functions.

25. The system of claim 24 wherein one said category displays a predetermined number of functions that have been most recently selected.

26. The system of claim 17 wherein said parameters include at least one cell address identifying a cell in said spreadsheet.

27. The system of claim 26 wherein the cell address is selected by clicking on said cell with a mouse.

28. The system of claim 26 wherein said parameters include a contiguous block of cells that are selected by dragging a mouse over the block of cells.

29. The system of claim 26 wherein said parameters are selected by typing the cell addresses on a keyboard.

30. The system of claim 17 wherein said second dialog box displays suggested parameters.

31. The system of claim 30 wherein said suggested parameters include cells in the same column above the current cell including the cell adjacent to the current cell and all contiguous cells filled with data.

32. The system of claim 30 wherein said suggested parameters include cells in the same row to the left of the current cell including the cell adjacent to the current cell and all contiguous cells filled with data.

33. A memory storage device for a computer program, said memory storage device storing a computer program that provides a method for constructing a formula in a cell of a spreadsheet, said method comprising the steps of:

displaying a first dialog box that lists selectable functions;

accepting the selection of one of the functions for insertion into the formula;

displaying a second dialog box for the selection of parameters for the selected function;

accepting the selection of parameters; and inserting the resultant formula into a result cell.

34. The memory storage device of claim 33 wherein said method, before said inserting step, further comprises the steps of:

displaying a third dialog box for selecting the result cell in which the formula is to be placed; and accepting the selection of the desired result cell.

35. The memory storage device of claim 34 wherein a default result cell is identified as the current cell.

36. The memory storage device of claim 33 wherein said first dialog box includes a description of the selected function.

37. The memory storage device of claim 33 wherein said first dialog box includes instructions for selecting parameters.

38. The memory storage device of claim 33 wherein said first dialog box lists a plurality of predetermined, commonly-used functions.

39. The memory storage device of claim 38 wherein other functions are displayed by selecting a button in said first dialog box.

40. The memory storage device of claim 39 wherein the other functions are displayed in lists associated with a plurality of categories of functions.

41. The memory storage device of claim 40 wherein one category displays a predetermined number of functions that have been most recently selected.

42. The memory storage device of claim 33 wherein said parameters include at least one cell address identifying a cell in the spreadsheet.

43. The memory storage device of claim 42 wherein said cell address is selected by clicking on the cell with a mouse.

44. The memory storage device of claim 42 wherein said parameters include a contiguous block of cells that are selected by dragging a mouse over the block of cells.

45. The memory storage device of claim 42 wherein said parameters are selected by typing the cell addresses on a keyboard.

46. The memory storage device of claim 33 wherein said second dialog box displays suggested parameters.

47. The memory storage device of claim 46 wherein said suggested parameters include cells in the same column above the current cell including the cell adjacent to the current cell and all contiguous cells filled with data.

48. The memory storage device of claim 46 wherein said suggested parameters include cells in the same row to the left of the current cell including the cell adjacent to the current cell and all contiguous cells filled with data.

* * * * *